July 10, 1962 H. W. REID, JR 3,043,275
DEVICE FOR CONTROL OF FLUID FLOW RATE
Filed Dec. 21, 1960
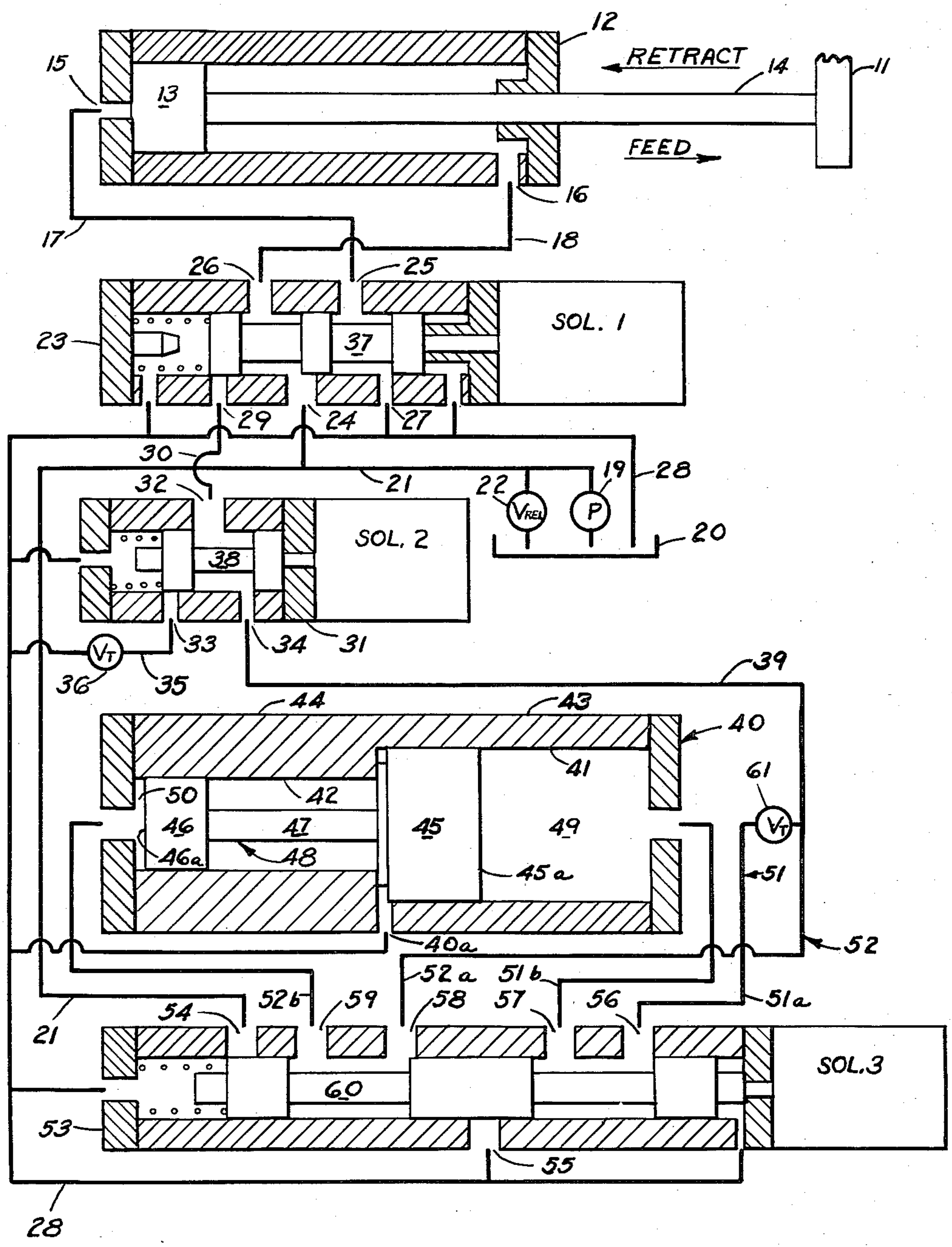
INVENTOR.
HORACE W. REID JR.
BY
Howard O. Keiser
& John F. Verhoeven
ATTORNEYS United States Patent Office 3,043,275

Patented July 10, 1962

3,043,275

DEVICE FOR CONTROL OF FLUID FLOW RATE

Horace W. Reid, Jr., Cincinnati, Ohio, assignor to The Cincinnati Milling Machine Co., Cincinnati, Ohio, a corporation of Ohio Filed Dec. 21, 1960, Ser. No. 77,372
11 Claims. (Cl. 121—38)

The present invention relates to mechanism for effecting a small controlled fluid flow in a hydraulic line particularly suitable in a machine tool hydraulic system for producing slow controlled movement, or feed, of a hydraulically actuated machine tool member, such as the wheelhead of a grinding machine.

Generally the rate of movement of a machine tool member driven by a hydraulic motor is controlled by regulating the flow of hydraulic fluid to or from the motor. This regulation is usually accomplished by means of an adjustable restriction in a motor line which provides an orifice of selected size to pass the fluid at a selected rate of flow. As the orifice is reduced to throttle the flow in the motor line, it has an increasing tendency to become clogged by foreign matter in the hydraulic fluid. Generally, the throttling of hydraulic fluid flow to a rate much below 5 cubic inches per minute is not recommended, and steady, reliable operation of a machine member actuating motor at a rate requiring a smaller flow of oil can not be expected from throttling the flow which passes through the motor.

In the present invention there is developed, without throttling, a controlled fluid flow considerably smaller than flow which can be effected through a restricted orifice. When flow in a line of a hydraulic motor which drives a machine tool member, such as the wheelhead of a grinding machine, is controlled in accordance with the present invention, a very slow controlled feed rate can be realized. This small unthrottled flow is accomplished by establishing a flow large enough for satisfactory control by throttling, and maintaining this larger flow in a predetermined ratio to, and considerably larger than, the flow in the motor line. By controlling the larger flow by throttling, the smaller flow is controlled, not by throttling, but by virtue of the predetermined relationship established between the two flows. In brief, in the preferred embodiment of the invention, a differential piston defines with a housing two chambers which are both connected, during controlled movement of the machine member, to the closed downstream end of a line which takes the full discharge of the machine member actuating hydraulic motor. The pressure in the motor discharge line acts on both faces of the differential piston to move the piston in one direction, expanding the chamber bounded by the larger piston face and contracting the chamber bounded by the smaller piston face. The rate of flow of fluid into the expanding chamber is established by a preset restriction, which may be a conventional flow control, or rate valve, and the flow out of the contracting chamber, which was filled with fluid prior to operation, is fed to the actuating motor discharge line upstream from the valve controlling the flow into the expanding chamber. When the differential piston is moved by a force differential resulting from the application of equal pressures to piston faces of different effective area, the flow from the contracting chamber entering the motor discharge line will be at a lesser rate than, and at a rate proportional to, the rate of flow from the motor discharge line entering the expanding chamber. The difference between these rates of flow will also be in a fixed ratio to the flow into the expanding chamber, and when the differential piston is constructed so that the difference in these rates is small compared to the rate of fluid entering the expanding chamber, a net flow from the motor discharge line results which is small compared to the rate of fluid flow from the discharge line to the expanding chamber. The rate of this small net flow from the motor discharge line, which determines the rate of movement of the machine member, can be changed by changing the larger rate of flow to the expanding chamber of the differential piston, and hence the small net flow is controlled by controlling the relatively larger flow entering the expanding differential piston chamber. Thus, by maintaining a fixed relationship between the flow in a motor line and a relatively large flow, and controlling the large flow, the flow in the motor line is controlled without throttling.

It is therefore one object of the present invention to produce a small unthrottled controlled flow in a fluid line.

It is another object of the present invention to produce a small unthrottled flow in a hydraulic motor line controlled by throttling a larger flow.

It is yet another object of the present invention to provide an improved hydraulic system for a machine tool to effect slow controlled movement of a machine tool member, such as the wheelhead of a grinding machine.

Other objects and advantages of the present invention should be readily apparent by reference to the following specification, considered in conjunction with the accompanying drawing forming a part thereof, and it is to be understood that any modifications may be made in the exact structural details there shown and described, within the scope of the appended claims, without departing from or exceeding the spirit of the invention.

The drawing is a schematic diagram of a hydraulic system illustrating the preferred embodiment of the present invention.

There is shown in the drawing a member 11 which may, for example, be a portion of the wheelhead of a grinding machine. A hydraulic motor 12 has a piston 13 connected by rod 14 to the member 11. The motor 12 has ports 15 and 16 on the respective sides thereof which are connected respectively to motor lines 17 and 18. A pump 19 receives fluid from a sump 20 and discharges it under pressure to pressure line 21, relief valve 22 being connected between pressure line 21 and the sump to prevent excessive pressure in the line 21. A reversing valve 23 has a pressure port 24 connected to pressure line 21 and two motor ports 25 and 26 connected, respectively, to motor lines 17 and 18. The reversing valve also has a return port 27 connected to a return line 28 which leads to the sump, and a port 29 connected to line 30 leading to a selector valve 31. The selector valve 31 has an inlet port 32 connected to line 30 and two outlet ports 33 and 34. Outlet port 33 is connected to return line 28 through line 35 containing a conventional rate valve 36.

When solenoid SOL1, which is connected to the movable valve member 37 of valve 23, is deenergized and the valve member is in the position shown, a rapid movement of piston 13 to the left (and retraction of member 11) is effected in a conventional manner since pressure line 21 is connected through valve 23 to motor line 18 and motor line 17 is connected through valve 23 to return line 28. When solenoid SOL1 is energized and valve member 37 is shifted to the left of the position shown, pressure from line 21 is supplied through valve 23 to motor line 17 and motor line 18 is connected to the inlet port 32 of selector valve 31 through valve 23 and line 30. If solenoid SOL2 of valve 31, which is connected to the movable valve member 38 of the valve, is also energized to shift valve member 38 to the left of the position shown, the full discharge from port 16 of the motor 12 is directed to sump 20 through the rate valve 36 and a conventional feed of piston 13 to the right is effected, the rate of feed being determined by the size at which the orifice in valve 36 is set.

If a feed movement of member 11 to the right is desired which would require a smaller discharge flow from port 16 of motor 12 than can be satisfactorily obtained by the throttling action exerted by valve 36 on the flow therethrough, solenoid SOL2 is deenergized while solenoid SOL1 remains energized. The full discharge of motor 12 through line 18, valve 23, and line 30 is diverted by valve 31 to port 34 and motor discharge line 39.

A housing 40 defines two control cylinders 43 and 44 having, respectively, connecting cylindrical bores 41 and 42. A port 40*a* at the junction of the cylindrical bores is connected to return line 28. Two pistons 45 and 46 are connected by a rod 47 to define a single differential piston designated generally as 48. Piston 45 is received in bore 41 and has a face 45*a* which, with cylinder 43, defines a chamber 49, face 45*a* constituting one wall of the chamber 49. Piston 46 is received in bore 42 and has a face 46*a* which, with cylinder 44, defines a chamber 50, face 46*a* constituting one wall of chamber 50. The diameters of pistons 45 and 46 are different, the diameter of piston 45 being larger than the diameter of piston 46 so that when the differential piston is moved to the left, expanding chamber 49 and contracting chamber 50, the volume of chamber 49 increases at a faster rate than the rate at which the volume of chamber 50 decreases.

Discharge line 39 terminates in two control branch lines 51 and 52, which are connectable through a charging valve 53 to chambers 49 and 50, respectively. The charging valve 53 has a pressure port 54 and a return port 55 connected, respectively, to pressure line 21 and return line 28. The valve 53 has a pair of ports 56 and 57 connected, respectively, to one end 51*a* and the other end 51*b* of control branch line 51. Valve 53 has another pair of ports 58 and 59 connected, respectively, to one end 52*a* and the other end 52*b* of control branch line 52. When solenoid SOL3 is deenergized, valve member 60 is in an operating position as shown to put the valve 53 in an operating condition. Port 56 is connected to port 57, port 58 is connected to port 59, and these four ports are all isolated from pressure port 54 and return port 55. Thus, a loop, or circuit, is defined by line 51, chamber 49, differential piston 48, chamber 50 and control line 52 which closes off the downstream end of the discharge line 39. When solenoid SOL3 is energized, the valve member 60 is shifted to the left of the position shown to a charging position to put the valve 53 in a charging condition. The downstream end of line 39 remains closed since ports 56 and 58, which are connected respectively to the branch line ends 51*a* and 52*a* emanating from line 39, are isolated. With valve member 60 in the charging position, port 57 is connected to port 55 to connect chamber 49 to return line 28, and port 59 is connected to port 54 to connect chamber 50 to pressure line 21.

In a typical machine cycle, the member 11 is retracted by deenergizing solenoid SOL1 and, after the member 11 is in the position shown, solenoid SOL1 and solenoid SOL2 are energized to commence feeding movement to the right. With solenoid SOL2 energized, discharge flow from motor port 16 flows through rate control valve 36. During this time line 39 is isolated from motor 12 and the mechanism comprising the housing 40 and differential piston 48 is charged, or conditioned, for operation by energizing solenoid SOL3. With solenoid SOL3 energized the chamber 49 is connected to the return line 28 and chamber 50 is connected to pressure line 21 and the differential piston 48 is moved to the right, contracting chamber 49 to empty that chamber to sump, and expanding chamber 50 to fill the latter chamber with fluid. After the differential piston 48 is in its extreme right hand position, solenoid SOL3 is deenergized, returning valve member 60 to the operating position as shown.

Thereafter, when a very slow feed is desired, as for example, at the end of a grind cycle, solenoid SOL2 is deenergized and the full discharge from motor 12 is switched from line 35 to line 39. Since line 39 is closed from the sump, the fluid in the line will be under a pressure which will be applied to piston faces 45*a* and 46*a* through the lines 51 and 52 connected to chambers 49 and 50, respectively. The difference in area between the smaller face 46*a* and the larger face 45*a* is small compared to either face, particularly the larger face 45*a*, and a small net force will act on the differential piston to move it to the left. At this time cylinder 43 and piston 45 operate as a control motor, moving rod 47 to the left in response to a flow of control fluid under pressure received through control branch line 51, and cylinder 44 and piston 46 act as a control pump discharging control fluid under pressure into line 52 in response to the movement of rod 47 to the left. Because of the small difference in effective cross sectional area of the chamber 49 and chamber 50, and since the piston 45 and 46 move at the same rate, the rate at which fluid enters the expanding chamber 49 will be slightly greater than the rate at which fluid is discharged from the contracting chamber 50. Since the ratio of the areas of pistons 45 and 46 is fixed and the pistons move at the same rate, the ratio of the rate of discharge from chamber 50 is fixed relative to the rate of flow into chamber 49. It will be noted that when the ratio between the rate of discharge of chamber 50 and the rate of flow into chamber 49 is fixed, the difference between these rates must be in a fixed ratio to the flow into chamber 49.

Branch control line 51 has a rate valve 61 therein, which may be similar to rate valve 36, and branch control line 52 emanates from line 39 upstream from the valve 61. As the differential piston 48 moves to the left, fluid flows from the closed line 39 through line 51 at a rate determined by valve 61, and fluid is pumped to the line 39, upstream from valve 61, through line 52 at a rate proportional to, but slightly less than, the rate at which fluid flows from line 39 through line 51. Thus a net flow, at a rate small compared to the flow through branch line 51, is established from line 39. Since the total discharge from motor 12 is at this time diverted to line 39, a slow controlled feed movement of member 11 is effected.

By way of example, a face 45*a* may have an area of 10 square inches and piston face 46*a* may have an area of 9 square inches. If rate valve 61 were set to permit a flow of 10 cubic inches of fluid per minute through line 51, the chamber 49 would expand at a rate of 10 cubic inches per minute to impart a movement of one inch per minute to piston 45 and rod 47. Rod 47 would move piston 46 to the left at a rate of one inch per minute to contract chamber 50, which was filled with oil before the slow feed operation began, at a rate of 9 cubic inches per minute. Since line 51 takes oil from line 39 at a rate of 10 cubic inches per minute and line 52 supplies oil to line 39 at a rate of 9 cubic inches per minute, the net flow of one cubic inch per minute occurs from line 39. It will be noted that this net fluid flow from line 39 is stored in the system since for each 9 cubic inches delivered to the line from chamber 50, ten cubic inches of oil is received in chamber 49. This stored net flow is subsequently dumped when chamber 50 is connected to pressure and chamber 49 connected to the sump through valve 53 when the system is recharged. Thus, by throttling a relatively large flow, a controlled unthrottled net flow one-tenth the rate of the throttled flow is realized.

If rate valve 61 were changed to admit, for example, eight cubic inches per minute of flow to chamber 49, differential piston 48 would be moved at a rate of 0.80 inch per minute and 7.20 cubic inches per minute would be pumped into line 39, producing a net flow from line 39 of 0.80 cubic inch per minute, again one-tenth the flow which is controlled by rate valve 61. Thus the net flow in line 39 will always be in a predetermined ratio to the controlled flow in line 51.

The flow of fluid through a rate valve will become erratic, even if the orifice thereof is sufficiently large to avoid clogging, if the upstream pressure becomes too low. It will be noted that in the system shown line 51 is connected to line 39, which is closed from the sump, so that rate valve 61 operates on flow under substantially the full discharge pressure of motor 12. At the same time line 52 is also connected to line 39 so that the pressure therein is not substantially greater than the pressure in line 51. Thus, in the system shown, there are no great pressure differences which would render part of the system susceptible to leakage because of extremely high pressures, and render another part of the system unsuitable for flow control because of extremely low pressures. Moreover, in the system shown, the large difference between the controlled rate of flow and the small net rate of flow does not depend on a large difference in effective areas in the differential piston, and this member can be of any convenient size.

What is claimed is:

1. In a hydraulic system, a hydraulic motor, a first motor line connected to the hydraulic motor, a second hydraulic motor connected to the motor line to receive fluid from the motor line at one rate and a hydraulic pump connected to the motor line to deliver fluid to the motor line at a different rate, means mechanically connecting the second hydraulic motor to the pump to maintain a predetermined ratio between said rates, and a flow control valve in said circuit to regulate one of said rates.

2. A mechanism for limiting discharge of fluid in a line to a small controlled flow comprising the combination of a fluid control motor hydraulically connected to the line for operation by a control flow of fluid under pressure from the line, a fluid control pump mechanically connected to the motor for operation thereby and hydraulically connected to the line, said pump adapted when operated by the motor to deliver a control flow of fluid to the line at a rate less than and in a predetermined ratio to the rate of the control flow of fluid to the motor from the line, and a valve to control the rate of one of said control flows.

3. A mechanism for effecting a limited fluid discharge from the closed downstream end of a line comprising the combination of a pair of control cylinders each having a slidable piston therein, said pistons connected for simultaneous movement and said pistons and cylinders defining chambers varying in volume with a small difference in rates as said pistons move, one of said chambers expanding while the other contracts, a hydraulic control line connecting each of said chambers to said line whereby fluid under pressure in said line flows from the line to effect expansion of the chamber having the greatest rate of volume change, said expansion contracting the other chamber to effect flow of fluid therefrom to the line, a valve in one of said control lines to regulate the flow therein, and means to contract and empty the chamber having the greatest rate of volume change and expand and fill said other chamber with fluid to condition the mechanism for operation.

4. A device for effecting a small controlled discharge from the downstream end of a line comprising in combination a housing, a differential piston received in said housing to define with said housing two chambers of different cross-sectional areas, one of said chambers expanding at one rate and the other contracting at a different but proportional rate when the differential piston is moved, means connecting said chambers to said line to close the downstream end of the line, and means to regulate the rate of fluid flow between said line and one of said chambers.

5. A device according to claim 4 in which the difference in cross-sectional area of said chambers is small compared to the cross-sectional area of said one chamber.

6. In a machine tool having a movable member, a hydraulic system for effecting a slow controlled movement of said member comprising in combination a hydraulic motor connected to said member, a cylinder, a differential piston received in said cylinder to define two chambers therein, one of said chambers increasing in size and the other decreasing in size at a lesser rate as said differential piston is moved in one direction, means to move said differential piston in the opposite direction and fill said other chamber with fluid prior to controlled movement of said member, means defining a discharge passage to take the full fluid discharge of said motor during controlled movement of said member, said passage terminating in two branch lines connected, respectively, to said chambers, one of said branch lines having a rate valve to control the flow of fluid therein and the other of said branch lines emanating from said discharge passage upstream from said control valve.

7. In a machine tool having a source of fluid under pressure and a sump and having a member driven by a hydraulic motor, said machine tool having a line connectable to the motor to receive the full discharge therefrom when said member is driven in a predetermined direction, a device to effect a slow controlled movement of said member in said direction comprising in combination a housing, a differential piston received in said housing to define two fluid chambers having a difference in cross-sectional area of effective fluid receiving space small compared to the cross-sectional area of at least one of said chambers, means to shift the differential piston to contract the chamber of larger cross-sectional area and expand and fill with fluid the chamber of smaller cross-sectional area to condition the device for operation, a pair of control lines connectable respectively between said chambers and said discharge line to define with said chambers and differential piston a loop closing the downstream end of said discharge line, and a valve in one of said control lines to regulate the flow of fluid therein.

8. In a machine tool, a hydraulic system to effect a slow controlled movement of a machine member in a predetermined direction comprising in combination a source of fluid under pressure, a sump, a hydraulic motor connected to said member, a fluid line connectable to the discharge side of said motor when said member is moved in said predetermined direction, a housing, a differential piston having opposing piston faces received in said housing to define a pair of fluid chambers therewith of different effective cross-sectional area, the difference in the effective cross-sectional areas of said chambers being small compared to said areas, a pair of control lines each having one end connected, respectively, to one of said chambers and the other end connected to said line, a rate valve in one of said control lines to regulate the flow therein, a valve portion connected to the large chamber and the sump operable when the valve portion is in a charging condition to connect the chamber to the sump and operable when the valve portion is in an operating condition to close the chamber from the sump, and a valve portion connected to the smaller chamber and the source of fluid under pressure operable when the valve portion is in a charging condition to connect the chamber to the source of pressure and operable when the valve portion is in an operating condition to close said chamber from the source of pressure.

9. In a machine tool, a hydraulic system to effect a slow controlled movement of a machine member in a predetermined direction comprising in combination, a source of fluid under pressure, a sump, a hydraulic motor connected to said machine member and having a port through which fluid from the motor is discharged when the motor is driven to move the member in said predetermined direction, a fluid line connected to said port during movement of the member in said predetermined direction, a housing having a pair of cylindrical bores differing in diameter a small amount compared to either diameter, a differential piston received in the housing having a pair of faces received respectively in the bores and defining therewith two chambers, one of said chambers expanding and the other contracting as the differential piston moves, a pair of control lines each connectable between said fluid line and one of said chambers to move the piston in one direction for expansion of the chamber of larger diameter and contraction of the chamber of smaller diameter, a valve having an adjustable orifice in the control line connected to the chamber having the larger diameter, and a charging valve connected to the source of pressure and the sump and connectable to said chambers for selectively connecting the chamber of smaller diameter to the source of pressure and simultaneously connecting the chamber of larger diameter to the sump to move said differential piston in the opposite direction and fill the chamber of smaller diameter with fluid.

10. A system for producing a slow controlled operation of a hydraulic motor comprising means defining a pair of chambers including a pair of piston faces, each piston face constituting a wall of one of said chambers, said piston faces connected together for simultaneous movement, one chamber expanding at one rate and the other chamber contracting at a different rate as the piston faces move, means defining an unrestricted passage between one side of the motor and the chamber undergoing the smaller rate of change on movement of the piston faces, and means defining a passage connected to the chamber undergoing the larger rate of change on movement of the piston faces, said latter passage having a restriction therein to produce a controlled rate of flow therethrough and thereby produce a smaller controlled flow in said unrestricted passage.

11. A system for producing a slow controlled operation of a hydraulic motor having a discharge port comprising a housing having two chambers, a differential piston received in said housing having two connected piston faces of different effective areas, each face defining respectively one wall of one of said chambers, said chambers varying in volume at different rates as the differential piston is moved, one of said chambers expanding and the other contracting as the differential piston is moved in a predetermined direction, means defining an unrestricted passage between the discharge port of the motor and the chamber varying in volume at the lower rate as the differential piston moves, means defining a passage connected to the chamber varying in volume at the larger rate as the differential piston moves, said latter passage having a rate valve therein to control the flow of fluid therethrough.

No references cited.